United States Patent [19]

Harvey

[11] 4,235,551
[45] Nov. 25, 1980

[54] PHOTOGRAPHIC PRINTER WITH PRESET CORRECTION BUTTONS

[75] Inventor: Ronald B. Harvey, Minneapolis, Minn.

[73] Assignee: Pako Corporation, Minneapolis, Minn.

[21] Appl. No.: 881,423

[22] Filed: Feb. 27, 1978

[51] Int. Cl.³ .............................................. G03B 27/73
[52] U.S. Cl. .......................................... 355/38; 355/68
[58] Field of Search .................................. 355/35–38, 355/67–71, 83, 88, 77

[56] References Cited

U.S. PATENT DOCUMENTS

| | | | |
|---|---|---|---|
| 3,482,916 | 12/1969 | Mey et al. | 355/38 |
| 3,768,903 | 10/1973 | Steinberger et al. | 355/38 |
| 3,873,200 | 3/1975 | Crete et al. | 355/38 |
| 3,947,110 | 3/1976 | Yamada | 355/88 X |
| 4,068,943 | 1/1978 | Gyori | 355/38 |
| 4,099,862 | 7/1978 | Bickl et al. | 355/68 X |
| 4,150,894 | 4/1979 | Meyer et al. | 355/38 |

Primary Examiner—Donald A. Griffin
Assistant Examiner—W. J. Brady
Attorney, Agent, or Firm—Kinney, Lange, Braddock, Westman and Fairbairn

[57] ABSTRACT

A photographic printer includes incremental correction buttons or keys to permit the operator to request incremental color or overall density corrections. In addition, preset correction keys are provided which allow the operator to request a correction for a recognizable cause of off-balance prints such as incandescent or fluorescent lighting or snow scenes. The preset correction keys represent the desired correction for these recognizable causes which represent a combination of more than one incremental color or density correction.

9 Claims, 7 Drawing Figures

PHOTOGRAPHIC PRINTER WITH PRESET CORRECTION BUTTONS

BACKGROUND OF THE INVENTION

The present invention relates to photographic printers. In particular, the present invention relates to an improved system by which an operator of a photographic printer may provide corrections for negatives which would otherwise print incorrectly.

Printers produce color or black and white prints or transparencies from photographic film originals (generally negatives). High intensity light is passed through the film and imaged on the photosensitive print medium (film or paper). The photographic emulsion layers on the print paper or film are exposed and subsequently processed to produce a print of the scene contained in the original.

A critical portion of a photographic printer is the exposure control, which controls the exposure of the photosensitive medium in order to ensure that the image on the photosensitive medium is properly exposed. The exposure control may utilize inputs from several different sources in order to determine the proper exposure. Most automatic and semi-automatic printers use large area transmission density (LATD) sensors to sample the light transmitted by the negative either prior to or during the exposure. Control of the exposure is determined using a method known as "integration to grey". In addition, most photographic printers provide the means by which the operator may enter color and overall density corrections from an operator control panel. These corrections modify the exposure which would otherwise be provided in accordance with the LATD sensor signals.

The typical photographic printer provides the operator with a plurality of incremental correction keys by which the operator may request incremental changes in color or in overall density. By means of these correction buttons or keys, the operator may request increases or decreases in overall density from that provided by the integration to grey, or increases or decreases in a particular color (while maintaining overall density constant). A density button correction changes all three exposure times by a fixed percentage, while a color button correction changes the exposure times by reciprocal percentage amounts. Color/density button increments are ideally of constant density value throughout the buttoning range.

A skilled operator is able to identify negatives which will require button corrections. In many cases, these corrections will be only a single button, while in other cases, the required corrections may require more than one button.

SUMMARY OF THE INVENTION

The present invention is based upon the realization that certain causes of "off-balance prints" (i.e. negatives that do not yield acceptable prints with "integration to grey") are repeatable, are recognizable by a skilled operator who views the film, and involve a complex shift in color and/or overall density. Examples of these common, recognizable causes of off-balance prints are photographs taken under artificial lighting. Both incandescent and fluorescent lighting result in complex color shifts which, if uncorrected, will result in an unacceptable print. The color shifts for these two types of artificial lighting, however, are different. Similarly, snow and beach scenes can result in complex shifts in color and density, as can a number of other conditions related to either illumination or the content of the scene being photographed, or to the type of film being used.

Since these recognizable causes involve complex shifts, and therefore complex combinations of button corrections, the operator has been required to learn these shifts for the particular printer and processing of his developing lab and then apply the appropriate correction each time he encounters a particular negative exhibiting the recognizable cause. In some cases, the negative may require additional correction beyond the correction caused by illumination, content, or film type. This has required the operator to calculate the total corrections to the various colors and density before entering the appropriate button corrections.

The photographic printer of the present invention includes storage means which is capable of storing combinations of incremental color/density corrections which are required to correct for recognizable causes of off-balance prints. When the operator identifies a film exhibiting one of these recognizable causes, the operator merely depresses the appropriate preset correction key to provide the required correction, rather than being required to enter a complex combination of corrections through the incremental correction keys.

In preferred embodiments of the present invention, the storage means is an alterable store, so that the particular combination of incremental corrections corresponding to each of the preset correction keys may be modified. This permits the user of the printer to determine from experience the specific combination of incremental corrections required in his photographic lab in order to correct for each of the recognizable causes of off-balance prints.

DETAILED DESCRIPTION OF THE PREFERRED EMBODIMENTS

The photographic printer of the present invention greatly simplifies the procedure by which button or key corrections are made by the operator. By the use of preset correction keys which correspond to complex combinations of incremental color and/or density corrections, the operator is able to request correction for a particular recognizable cause of off-balance printing without requiring the operator to memorize each of the various complex combinations. This is particularly advantageous when the operator must add incremental corrections to the complex combination of corrections for that particular recognizable cause. The addition of incremental corrections to the complex combination of corrections is much simpler for the operator using the present invention.

Figure 1:
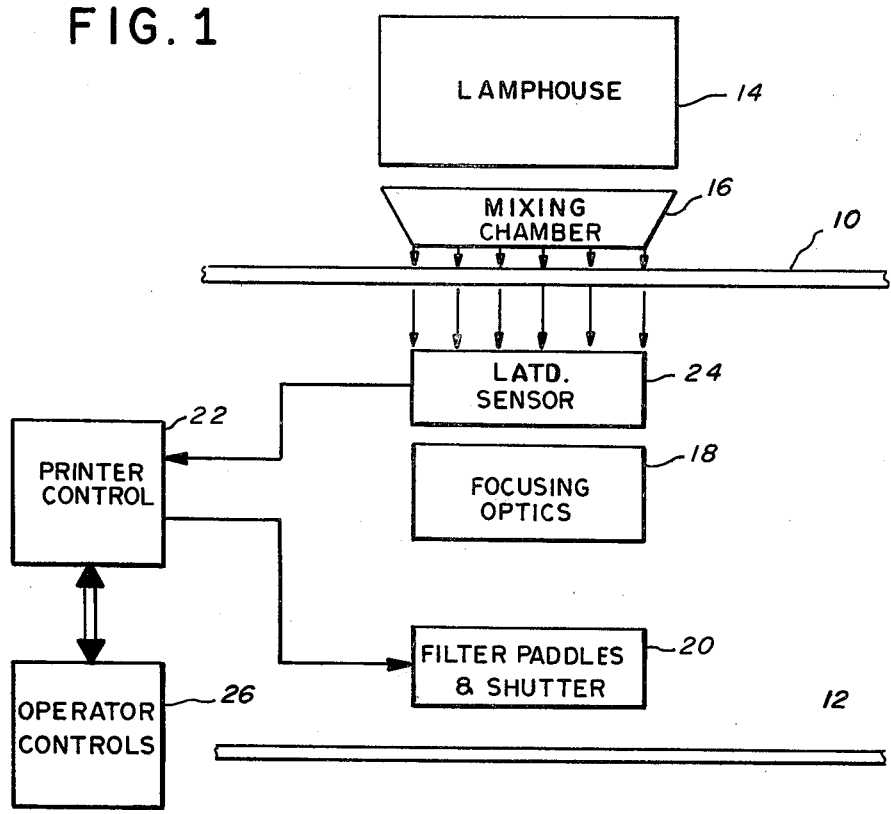
FIG. 1 is a functional block diagram of a photographic printer.

FIG. 1 illustrates a photographic printer system. In this printer, an image contained in film 10 is printed onto photosensitive paper 12. Light from lamphouse assembly 14 is diffused and mixed by mixing chamber 16 and passed through a frame of film 10. The light is then focused by focusing optics 18 onto an appropriate portion of paper 12.

The exposure time during which paper 12 is exposed to the image from film 10 is determined by the position of filter paddles and shutter 20. The filter paddles typically are a subtractive filter for each color channel (red, green, and blue). Filter paddles and shutter 20 are controlled by printer control 22.

In the embodiment shown in FIG. 1, printer control 22 receives input signals from large area transmission density (LATD) sensors 24 and from operator controls 26. In addition to the exposure control functions, printer control 22 may also control such functions as paper and film feed.

Figure 2:
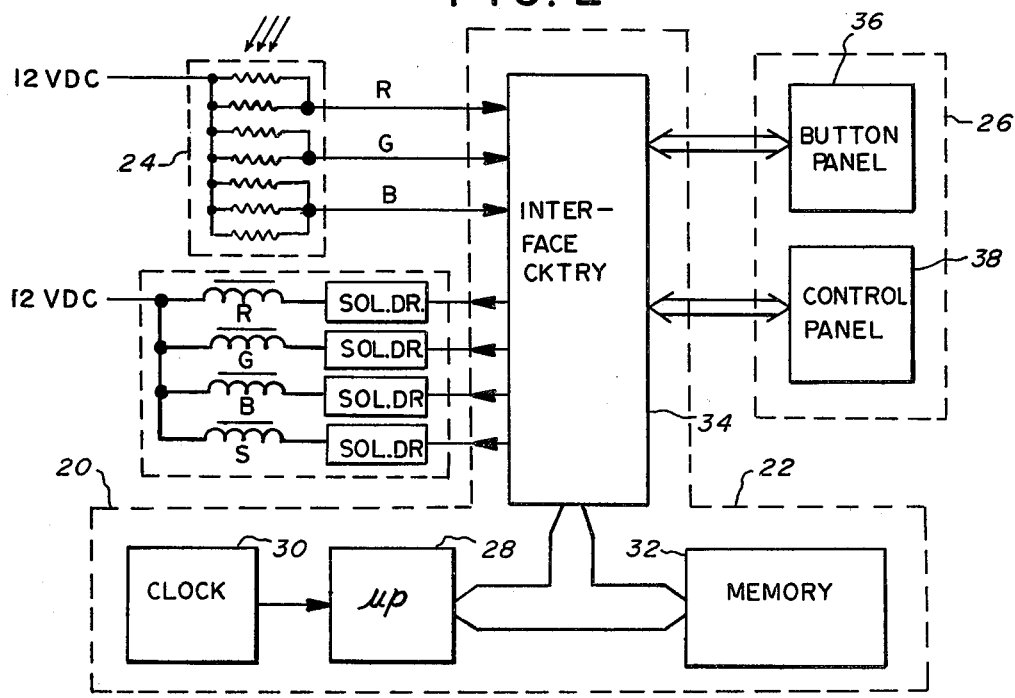
FIG. 2 shows a block diagram of the printer control in a preferred embodiment of the present invention.

FIG. 2 shows a preferred embodiment of printer control 22 as it interacts with filter paddles and shutter 20, LATD sensors 24, and operator controls 26. As shown in FIG. 2, printer control 22 includes digital processing and storage capabilities. In particular, printer control 22 includes a microprocessor 28, clock circuitry 30, memory 32, and interface circuitry 34. Memory 32 preferably contains both read/write and read only memory storage.

Interface circuitry 34 receives the red, green, and blue signals from LATD sensors 24 and converts these signals to digital values for use by microprocessor 28. Similarly, interface circuitry 34 provides signals from microprocessor 28 to the appropriate soleniod driver associated with filter paddles and shutter 20.

In the preferred embodiment shown in FIG. 2, operator controls 26 include button panel 36 and control panel 38. These two panels are shown in further detail in FIGS. 3 and 4, respectively. Interface circuitry 34 multiplexes and supplies the various signals from button panel 36 and control panel 38 to microprocessor 28, and supplies the appropriate driving signals from microprocessor 28 to panels 36 and 38 to control the various displays and indicators contained on these panels.

Figure 3:
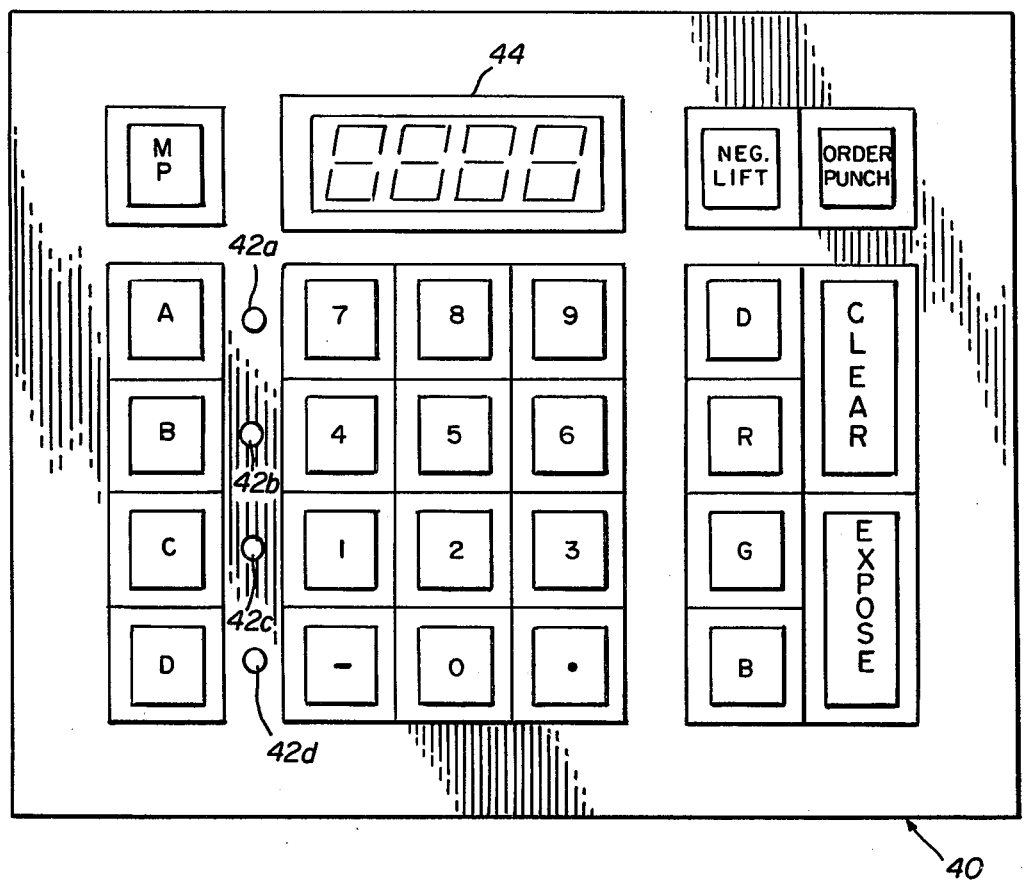
FIGS. 3 and 4 show a button panel and a control panel, respectively, used in a preferred embodiment of the present invention to permit the operator to supply control information to the printer control.

FIG. 3 shows button panel 36, which includes a keyboard through which color and density button corrections can be made. The keyboard includes incremental keys 40, and the D, R, G, and B buttons which designate a density or a red, green, or blue incremental correction, respectively. In addition to the incremental button corrections, four "preset correction keys" designated A, B, C, and D are included on panel 36. These four keys are used to provide complex combinations of incremental buttons in accordance with the present invention. As shown in FIG. 3, indicator lamps 42a, 42b, 42c, and 42d are positioned next to the A, B, C, and D keys. These indicator lamps indicate when the operator has selected one of the preset correction buttons.

Button panel 36 also includes a display 44 which displays the incremental corrections for each color channel. As will be discussed later, the display can contain a single button correction or a combination of button corrections, and is updated if the operator makes additional incremental corrections through keyboard 40 and the D, R, G, and B keys.

The density and color button corrections from button panel 36 are provided to microprocessor 28 through interface circuitry 34. When a print cycle is initiated, the digital density and color button values displayed on display 44 are converted by microprocessor 28 to digital exposure time corrections which yield the desired density or color change. These exposure time corrections are then added to or subtracted from the normal exposure time which is either derived from the LATD sensor signal or from an exposure time stored in memory 32.

Figure 4:
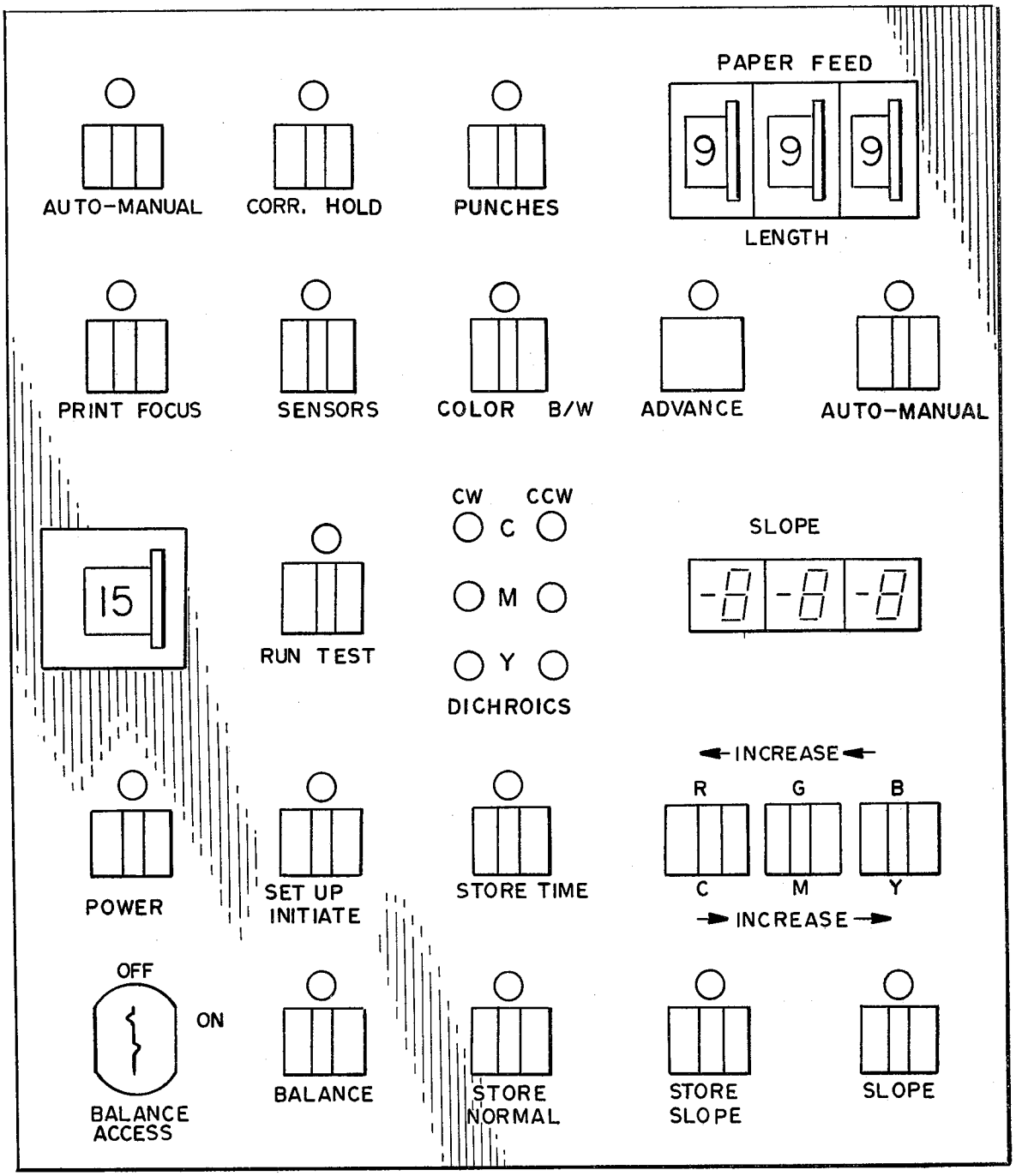

FIG. 4 shows a portion of control panel 38. The operator controls contained on control panel 38 are related to color balancing, slope, and a number of other machine functions which are not directly related to the present invention. The function of the various buttons, switches, displays on control panel 38, therefore, will not be discussed except as they may directly relate to the present invention.

Figure 5:
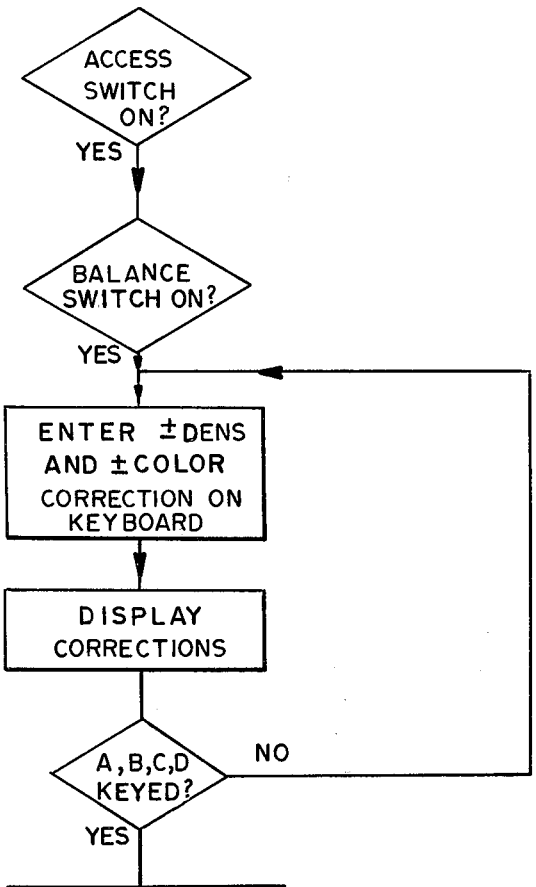
FIG. 5 is a functional flow diagram illustrating a method by which the initial values of the present correction keys are stored.
Figure 7:
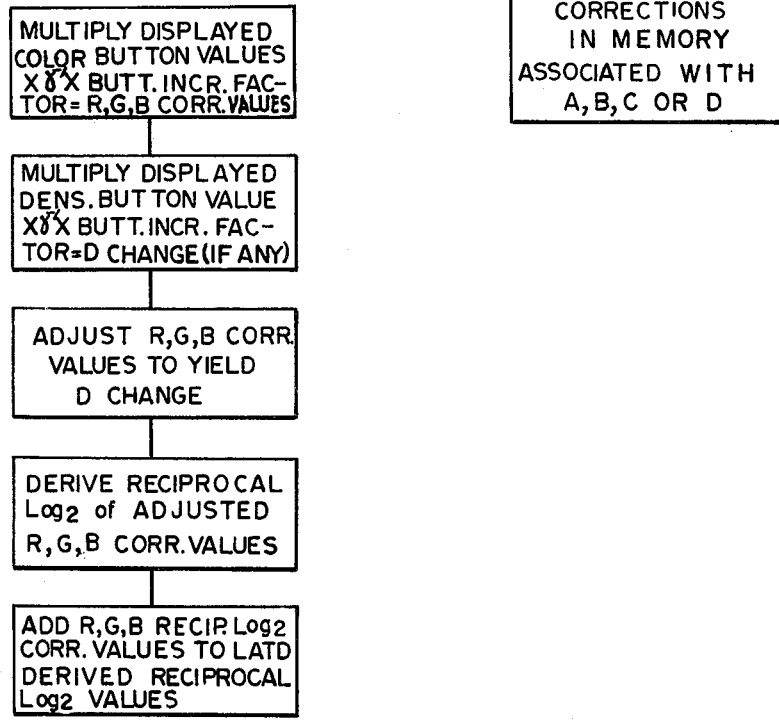
FIG. 7 is a functional flow diagram illustrating the method by which correction key values are converted to exposure time corrections and used to correct exposure times derived from LATD sensor values.
Figure 6:
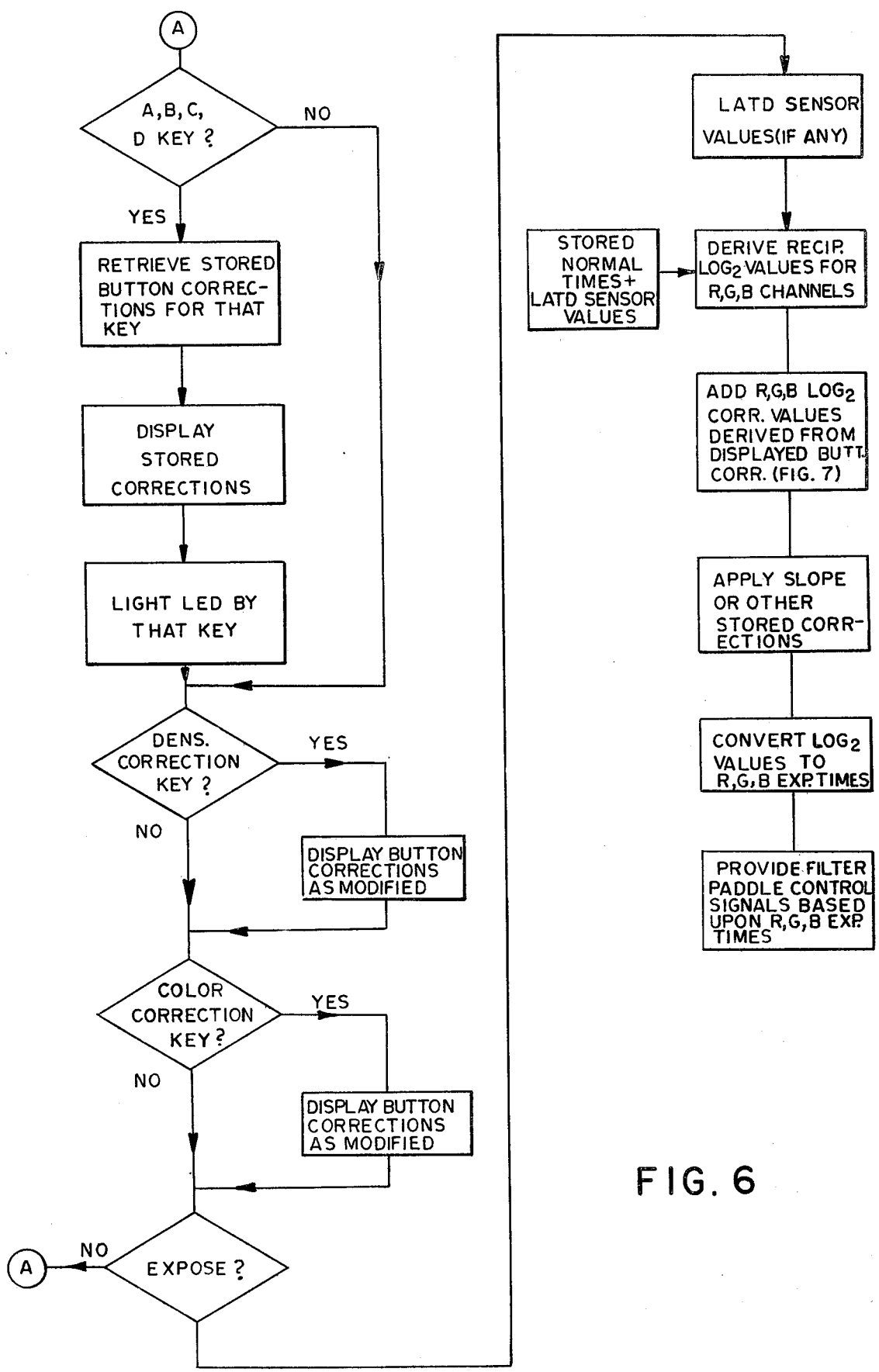
FIG. 6 is a functional flow diagram illustrating the determination of exposure times by the printer control when a preset correction key is actuated.

FIGS. 5, 6, and 7 are functional flow diagrams which describe the operation of printer control 22 in accordance with the present invention. In FIG. 5, the operation is performed when the particular complex combination of incremental corrections is stored for each of the A, B, C, and D preset keys is shown. In preferred embodiments of the present invention, preset keys A, B, C, and D may be altered by the operator in order to tailor the desired correction to the particular photo finishing lab. The operator can set the values of the A, B, C, and D buttons by turning both the Access and Balance switches on control panel 38 to their "ON" position. The operator then keys the particular ± density and/or ± color corrections by keying the D, R, G, or B button and the appropriate numerical button contained on keyboard 40. These values are received by microprocessor 28, which causes display 44 to display the corrections which have been entered. When the operator depresses the A, B, C, or D key, microprocessor 28 stores the corrections displayed on display 44 in memory locations associated with the A, B, C, or D key. The combination of corrections which have been stored are then available for later use whenever the operator depresses the particular preset correction key which he desires.

FIG. 6 illustrates the operation of printer control 22 during a normal printing cycle in which an A, B, C, or D key (and possibly additional density or color corrections) has been entered by the operator. As shown in FIG. 6, the microprocessor 28 determines by scanning the state of each of the keys whether an A, B, C, or D key has been depressed. If so, microprocessor 28 retrieves the stored combination of button corrections corresponding to that key from memory 32. Display 44 is caused to display the stored button corrections which have been retrieved by microprocessor 28, and the light emitting diode indicator 42a-42d corresponding to the particular preset correction key is lighted.

At this point, microprocessor 28 determines whether a density correction key has also been depressed by the operator. If so, the incremental density correction is added or subtracted from the values displayed on display 44 and the modified corrections are displayed.

Microprocessor 28 then determines whether a color correction key has also been entered by the operator. Once again, if a color correction key has been entered, the values displayed on display 44 are modified and redisplayed. This interrogation of the A, B, C, D, density, and color correction keys continues until the operator depresses the Expose key. At that point, a print cycle begins. The exposure times used in printing will be modified by the corrections then being displayed on display 44.

As shown in FIG. 6, microprocessor 28 receives the LATD sensor values (provided the Sensor switch on control panel 38 is turned ON). Microprocessor 28 uses the LATD sensor values and/or stored normal exposure times and LATD sensor values to derive a reciprocal $\log_2$ value for each of the red, green, and blue color channels. To these three reciprocal $\log_2$ values, microprocessor 28 adds the red, green, and blue reciprocal $\log_2$ correction values derived from the displayed button corrections on display 44. The derivation of the reciprocal $\log_2$ correction values in one preferred embodiment is described in FIG. 7 and will be discussed in further detail later.

After the button corrections have been used to modify the reciprocal $\log_2$ values, slope and other stored corrections may also be used to modify the reciprocal $\log_2$ values. These reciprocal $\log_2$ values are then converted to red, green, and blue exposure times. Microprocessor 28 provides filter paddle and shutter control signals to the appropriate solenoid drivers of filter paddles and shutter 20 based upon these three exposure times.

As shown in FIG. 7, first, microprocessor 28 derives red, green, and blue correction values by multiplying each of the red, green, and blue button corrections displayed on display 44 times the gamma factor and times a button increment factor. Second, microprocessor 28 performs a similar function with respect to the displayed density button correction (if any) to derive a desired overall density change. Third, microprocessor 28 adjusts the red, green, and blue correction values to achieve the desired overall density change. Since a color correction of one color would necessarily involve an overall density change unless the remaining colors are changed in an opposite direction, the adjustment involves decreasing some of the correction values while increasing others in order to yield the desired overall density.

Fourth, the adjusted red, green, and blue correction values are converted to reciprocal $\log_2$ values. They are then in the form necessary to be added to the reciprocal $\log_2$ values derived from the measured LATD sensor values (or merely from the stored normal times and stored LATD sensor values).

The preset correction keys or buttons of the present invention significantly simplify the tasks required of the operator of the printer. Rather than requiring the operator to key in a complex combination of density and color corrections each time a recognizable cause of off-balance prints is observed, the present invention allows him to make the necessary correction by merely depressing a single key. In addition, it greatly simplifies the situation where the operator desires to make further corrections in addition to the corrections associated with the recognizable cause.

One particularly advantageous use of the preset correction keys of the present invention is in a small photo finishing lab which on occasion encounters different film types from those commonly being used. This will occur, for example, when a person who has saved older film types for several years finally uses the film and brings the film to the photo finisher for processing.

Since the older film type has a different characteristic from the newer, more commonly used film types, every frame of the older film type will require the same complex combination of corrections. In addition, if any of the particular scenes photographed on the film require additional correction (e.g. because of artificial lighting or snow/beach scene conditions), further incremental correction buttoning or further preset correction buttoning may be required.

In this situation, photo finishers have been faced with either using a complex button correction over and over each time the older film types are encountered, or segregating the various film types as they come into the photo finishing plant, and providing a separate setup for each of these various film types. The segregation and separate setup requires additional time and is generally avoided if possible.

The present invention handles the situation of different film types requiring complex button corrections in a highly advantageous manner. By determining the complex button correction and assigning one of the preset keys to that film type, the operator is able to avoid the segregation and separate setup otherwise required when older film types are encountered. It also makes it extremely easy for the operator to add additional color corrections or density corrections to the complex button correction which is applied to all frames of the older film type.

In one preferred embodiment of the present invention, control panel 38 includes a "Correction Hold" switch. When this switch is turned on, the last correction displayed on display 44 continues to be displayed for future use and reference. Keying the Expose key directly will apply this display correction. Additional corrections may be added to or subtracted from the held correction and the new total will be displayed and will be applied when the Expose key is depressed. This new total also becomes the new correction held. Depressing the Clear key will return display 44 to 0,0,0,0 and re-establish a no correction addition. If Correction Hold switch is off, display 44 returns to 0,0,0,0 and a no correction condition after every print cycle.

It can be seen that when every print from a film will require the same complex correction (as in the case of an old film type), the entire film can be printed very rapidly by depressing the particular preset correction key corresponding to that film type and placing the Correction Hold switch in the ON position.

In conclusion, the present invention is a highly advantageous improvement to photographic printer systems. Properly used, it can significantly increase the throughput of the printer when complex density and color corrections are required for particular types of recognizable causes of off-balance prints either related to the content of the scene, to the type of lighting used in taking the photograph, or the characteristics of the particular film type in comparison to other film types more commonly used.

Although the present invention has been described with reference to preferred embodiments, workers skilled in the art will recognize that changes may be made in form and detail without departing from the spirit and scope of the invention. For example, although four preset correction keys have been specifically shown, workers skilled in the art will recognize that this number may be increased or decreased depending upon the particular needs of the user. Similarly, although a specific method has been described by which exposure times are derived from LATD sensor values and from the displayed correction values, other methods which derive exposure time from these inputs may also be used in conjunction with the present invention.

What is claimed is:

1. For use in a photographic printing system, the improvement comprising:
   a plurality of incremental correction keys each for requesting, when actuated, an incremental color or density correction;
   alterable storage means for storing a plurality of combinations of incremental corrections, each combination comprising more than one incremental color or density correction required to correct a recognizable cause of off-balance photographic prints;
   a plurality of preset correction keys each for requesting, when actuated, one of the plurality of combinations of incremental corrections stored by the alterable storage means;
   operator control switch means for selecting a first or a second operating mode; and
   digital processor means for receiving signals from the actuated incremental correction keys, the actuated preset correction keys, and the operator control switch means, the digital processor means storing in the alterable storage means the combination of incremental corrections requested by the actuated incremental correction keys in a memory location associated with the actuated preset correction key when the operator control switch means selects the first operating mode, and totalling the corrections requested by the actuated incremental correction keys and actuated preset correction keys and providing exposure correction signals as a function of the totals of corrections when the operator control switch means selects the second operating mode.

2. The invention of claim 1 and further comprising:
   display means for displaying totals of corrections requested by the incremental correction keys and the preset correction keys;
   exposure key means for providing a signal to the digital processor means to initiate a print exposure cycle if the second operating mode is selected by the operator control switch means;
   wherein the digital processor means controls the display means as a function of the signals received from the actuated incremental correction keys and the actuated preset correction keys; and
   wherein the digital processor means provides exposure correction signals used in printing photographic prints which are a function of the totals of corrections displayed by the display means when the expose key means initiates the print exposure cycle.

3. The invention of claim 2 and further comprising:
   correction hold means for providing a signal to the digital processor means to cause the display means to continue displaying the totals of the corrections after completion of a print exposure cycle, and wherein the digital processor means, in the absence of the signal from the correction hold means, resets the totals of corrections to zero after completion of a print exposure cycle.

4. In a photographic printing system, the improvement comprising:
   a plurality of incremental correction keys each for requesting an incremental color or density correction;
   a plurality of preset correction keys each for requesting a combination of more than one incremental color or density correction required to correct for a recognizable cause of off-balance prints;
   alterable storage means for storing the combination of incremental corrections corresponding to each of the preset correction keys;
   means for altering the stored combination of incremental corrections corresponding to a preset correction key;
   means for totalling corrections requested by the incremental correction keys and the preset correction keys;
   means for initiating print exposure cycles; and
   exposure control means for modifying exposures as a function of the totalled corrections when the means initiates a print exposure cycle.

5. The invention of claim 4 and further comprising:
   correction hold means for causing the exposure control means to continue to modify exposures as a function of the same totalled correction during a plurality of print exposure cycles.

6. The invention of claims 4 or 1 wherein one of the plurality of preset correction keys is for photographs taken under incandescent lighting.

7. The invention of claims 4 or 1 wherein one of the preset correction keys is for photographs taken under flourescent lighting.

8. The invention of claims 4 or 1 wherein one of the preset correction keys is for photographs containing a snow/beach scene.

9. The invention of claims 4 or 1 wherein one of the preset correction keys is for a film type other than one for which the printer is set up to print.

* * * * *